United States Patent
Park

(10) Patent No.: US 8,274,607 B2
(45) Date of Patent: Sep. 25, 2012

(54) IMAGE PROCESSING APPARATUS AND CONTROL METHOD THEREOF

(75) Inventor: Hye-joung Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 523 days.

(21) Appl. No.: 12/512,194

(22) Filed: Jul. 30, 2009

(65) Prior Publication Data

US 2010/0225821 A1    Sep. 9, 2010

(30) Foreign Application Priority Data

Mar. 9, 2009   (KR) .................. 10-2009-0019912

(51) Int. Cl.
*H04N 9/77* (2006.01)
*H04N 9/78* (2006.01)

(52) U.S. Cl. ...................... 348/663; 348/665

(58) Field of Classification Search .................. 348/663, 348/665–667, 669, 670, 712, 713; *H04N 9/77, H04N 9/78*
See application file for complete search history.

(56) References Cited

U.S. PATENT DOCUMENTS

| 4,189,755 A | 2/1980 | Balbes et al. |
| 4,651,196 A | 3/1987 | Harwood et al. |
| 5,519,454 A * | 5/1996 | Willis .......................... 348/663 |
| 2008/0074553 A1 | 3/2008 | Hsiung |

FOREIGN PATENT DOCUMENTS

| EP | 0 763 949 A2 | 3/1997 |
| EP | 1 708 491 A2 | 10/2006 |
| WO | 92/12600 A1 | 7/1992 |

OTHER PUBLICATIONS

Extended European search report issued in counterpart European Application No. 10151974.2 dated Mar. 3, 2010.

* cited by examiner

*Primary Examiner* — Sherrie Hsia

(74) *Attorney, Agent, or Firm* — Sughrue Mion, PLLC

(57) ABSTRACT

An image processing apparatus is provided, including: a first image processing unit which converts an input image signal into a brightness signal and a chromaticity signal; and a second image processing unit which adjusts a bandwidth used to filter the chromaticity signal to correspond to a noise level of the image signal, and filters the chromaticity signal with the adjusted bandwidth to extract a chrominance signal.

22 Claims, 3 Drawing Sheets

IMAGE PROCESSING APPARATUS AND CONTROL METHOD THEREOF

CROSS-REFERENCE TO RELATED APPLICATION

This application claims priority from Korean Patent Application No. 10-2009-0019912, filed Mar. 9, 2009 in the Korean Intellectual Property Office, the disclosure of which is incorporated herein by reference in its entirety.

BACKGROUND OF THE INVENTION

1. Field of the Invention

Apparatuses and methods consistent with the present invention relate to processing an image signal to be displayed, and more particularly, to an image processing apparatus and a control method thereof dividing and converting a composite image signal which includes various components.

2. Description of the Related Art

An image processing apparatus processes an image signal so that the input image signal can be displayed as an image. The image processing apparatus may output the processed image signal to a separate display apparatus or a display unit provided with the image processing apparatus.

An image signal input to the image processing apparatus may be generated based on various standards. For example, an image signal, such as a composite image signal, a super (S) image signal, a component image signal, etc., may be input to the image processing apparatus.

In the composite image signal, a brightness component and a color component are merged to a single signal to be transmitted via a single line to the image processing apparatus. The image processing apparatus receives the composite image signal and divides components included in the composite image signal by using a plurality of image processing processes.

In the composite image signal, each component exists in different frequency bands. Accordingly, the image processing apparatus filters the image signal in predetermined various bandwidths to extract a specific component from the image signal and exclude interference between components which have frequency bands adjacent to one another, and perform other various processes.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

According to an aspect of one or more exemplary embodiments of the present invention, there is provided an image processing apparatus, including: a first image processing unit which converts an input image signal to a brightness signal and a chromaticity signal; and a second image processing unit which adjusts a bandwidth applied to a filtering of the chromaticity signal to correspond to a noise level of the image signal, and performs the filtering of the chromaticity signal with the adjusted bandwidth to convert to a chrominance signal.

The second image processing unit may adjust the bandwidth to become narrower as the noise level becomes bigger.

The second image processing unit may include: a processing unit which filters the chromaticity signal with the bandwidth, a sensing unit which senses the amplitude of the noise level, and a control unit which selects one of a plurality of bandwidths previously determined to have different ranges depending on the sensed amplitude of the noise level.

The sensing unit may sense the amplitude of the noise level in a period of the image signal in which an image information is not included.

The sensing unit may sense the amplitude of the noise level in a horizontal synchronization period or a vertical blanking period of the image signal.

The second image processing unit may restrict the frequency of the chromaticity signal with the bandwidth to perform the filtering removing the brightness signal mixed to a predetermined frequency band of the chromaticity signal.

The first image processing unit may operate in one of a two-dimensional comb filtering and a three-dimensional comb filtering depending on at least one of a motion amount of the input image signal and the amplitude of the noise level.

The second image processing unit may perform the filtering with a bandwidth corresponding to the noise level, and the bandwidth corresponding to the noise level may become narrower as the noise level becomes bigger.

The filtering may include a chroma filtering.

The second image processing unit may increase the bandwidth if the noise level is less than a first setting value in a changing operation from the two-dimensional comb filtering to the three-dimensional comb filtering.

The second image processing unit may decrease the bandwidth if the noise level is equal to or more than a second setting value in a changing operation from the three-dimensional comb filtering to the two-dimensional comb filtering.

According to another aspect of one or more exemplary embodiments of the present invention, there is provided a control method for an image processing apparatus, including: converting an input image signal to a brightness signal and a chromaticity signal; and adjusting a bandwidth applied to a filtering of the chromaticity signal to correspond to a noise level of the image signal, and filtering the chromaticity signal with the adjusted bandwidth to convert to a chrominance signal.

The converting the chromaticity signal to the chrominance signal may include adjusting the bandwidth to become narrower as the noise level becomes bigger.

The converting the chromaticity signal to the chrominance signal may include: sensing the amplitude of the noise level, and selecting one of a plurality of bandwidths previously determined to have different ranges depending on the sensed amplitude of the noise level, and filtering the chromaticity signal with the selected bandwidth.

The sensing the amplitude of the noise level may include sensing the amplitude of the noise level in a period of the image signal in which an image information is not included.

The sensing the amplitude of the noise level may include sensing the amplitude of the noise level in a horizontal synchronization period or a vertical blanking period of the image signal.

The converting the chromaticity signal to the chrominance signal may include restricting the frequency of the chromaticity signal with the bandwidth to perform the filtering removing the brightness signal mixed to a predetermined frequency band of the chromaticity signal.

The converting the input image signal to the brightness signal and the chromaticity signal may include operating in one of a two-dimensional comb filtering and a three-dimensional comb filtering depending on at least one of a motion amount of the input image signal and the amplitude of the noise level.

The converting the chromaticity signal to the chrominance signal may include performing the filtering with a bandwidth corresponding to the noise level, and the bandwidth corresponding to the noise level becomes narrower as the noise level becomes bigger.

The filtering may include a chroma filtering.

The converting the chromaticity signal to the chrominance signal may include increasing the bandwidth if the noise level is less than a first setting value in a changing operation from the two-dimensional comb filtering to the three-dimensional comb filtering.

The converting the chromaticity signal to the chrominance signal may include decreasing the bandwidth if the noise level is equal to or more than a second setting value in a changing operation from the three-dimensional comb filtering to the two-dimensional comb filtering.

BRIEF DESCRIPTION OF THE DRAWINGS

The present invention will become apparent and more readily appreciated from the following description of the exemplary embodiments, with reference to the accompanying drawings, in which.

DETAILED DESCRIPTION OF EXEMPLARY EMBODIMENTS

Figure 1:
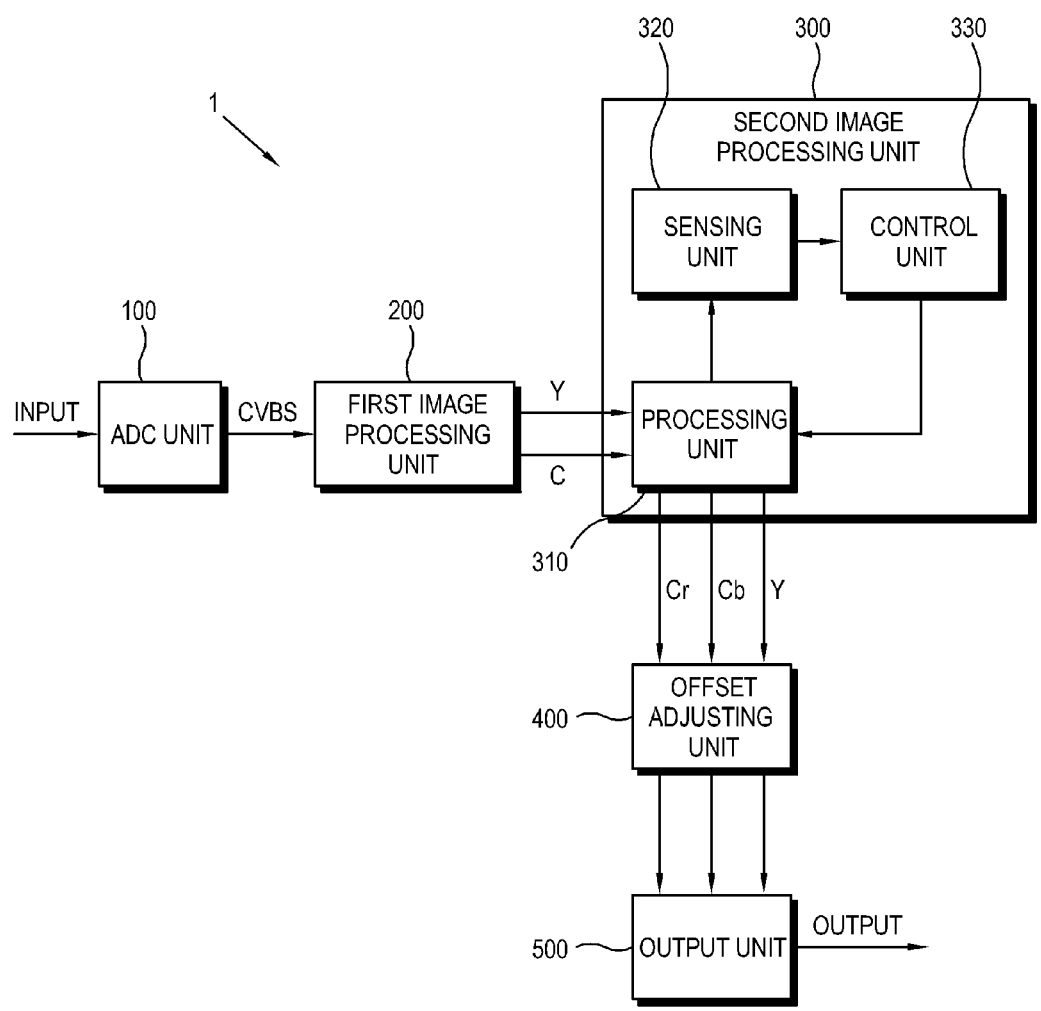
FIG. 1 is a configuration block diagram of an image processing apparatus according to an exemplary embodiment of the present invention.

Exemplary embodiments of the present invention are described in detail below with reference to the accompanying drawings.

In the following description, like drawing reference numerals are used for like elements, even in different drawings. The matters defined in the description, such as detailed construction and elements, are provided to assist in a comprehensive understanding of the invention. Also, well-known functions or constructions are not described in detail since they would obscure the invention with unnecessary detail.

FIG. 1 is a configuration block diagram of an image processing apparatus 1 according to an exemplary embodiment of the present invention. The image processing apparatus 1 according to the exemplary embodiment of the present invention may be implemented as a set top box, a digital versatile disk (DVD) player, a Blu-ray disk player, etc. Also, the image processing apparatus 1 may be implemented as a television, a monitor, a portable media player, a personal video recorder (PVR), etc., and may include a display panel displaying an image.

As shown in FIG. 1, the image processing apparatus 1 includes a first image processing unit 200, such as a comb filter unit, that converts an input image signal into a brightness signal Y and a chromaticity signal C, and a second image processing unit 300, such as a decoder, that converts the chromaticity signal C into chrominance signals Cb and Cr. Although in the present exemplary embodiment, the first image processing unit 200 includes a comb filter unit, and the second image processing unit 300 includes a decoder unit, the present invention is not limited thereto.

According to the present exemplary embodiment, the second image processing unit 300 performs filtering to remove the brightness signal Y component mixed to the chromaticity C in a process of converting the chromaticity signal C into the chrominance signals Cb and Cr. The second image processing unit 300 adjusts a frequency bandwidth applied to the filtering to correspond to a noise level of an image signal.

In detail, the second image processing unit 300 adjusts a filtering bandwidth to be relatively narrow if the noise level is relatively large, and adjusts the filtering bandwidth to be relatively wide if the noise level is relatively small. Accordingly, a cross color phenomenon caused by the brightness signal Y being mixed to the chromaticity signal C, resulting in an image deterioration can be prevented, while the loss of image information which may be caused due to the narrow filtering bandwidth is can be minimized.

The image processing apparatus 1 further includes an analog-to-digital converter (ADC) unit 100 that converts an analog signal to a digital signal, an offset adjusting unit 400 that performs an offset adjustment with respect to the chrominance signals Cb and Cr output from the second image processing unit 300, and an output unit 500 that converts and outputs the processed image signal in an appropriate format corresponding to the system configuration and/or demand.

Hereinafter, each element of the image processing apparatus 1 will be described.

The ADC unit 100 converts a composite image signal S, input as an analog composite video blanking sync (CVBS) signal, to a digital signal through sampling, quantizing, and binary encoding.

The first image processing unit 200 divides a composite image signal output from the ADC unit 100 into a brightness signal Y and a chromaticity signal C. Related to a frequency bandwidth, the chromaticity signal C is positioned to have the center frequency of approximately 3.58 MHz, and the brightness signal Y has the center frequency lower than the chromaticity signal C to be positioned in a lower frequency band of an image signal. The first image processing unit 200 filters the image signal by each frequency bandwidth to divide the image signal into the brightness signal Y and the chromaticity signal C.

The first image processing unit 200 operates in one of a two-dimensional comb filtering mode performing a space filtering and a three-dimensional comb filtering mode performing a time filtering depending on a motion amount of an input image signal or an amplitude of a noise level of the input image signal. The first image processing unit 200 may determine that the motion amount is large if the noise level of the image signal is large.

If the motion amount or the noise level of an image signal is relatively large, the first image processing unit 200 performs the two-dimensional comb filtering, which is a space filtering in vertical and horizontal directions with respect to the image signal. On the contrary, if the motion amount or the noise level of an image signal is relatively small, the first image processing unit 200 performs the three-dimensional comb filtering, which is a time filtering between frames with respect to the image signal.

When the brightness signal Y and the chromaticity signal C are input from the first image processing unit 200, the second image processing unit 300 divides the chromaticity signal C into two chrominance signals Cb and Cr to output the brightness signal Y and the chrominance signals Cb and Cr. For example, the second image processing unit 300 performs chroma filtering to remove the brightness signal Y mixed to the chromaticity signal C to prevent the cross color phenomenon.

The second image processing unit 300 may perform the chroma filtering process by restricting the chromaticity signal C in a predetermined bandwidth. The second image processing unit 300 may include a low pass filter (LPF) or a band pass filter (BPF) for the filtering process, but the present invention is not limited thereto.

The offset adjusting unit 400 adjusts contrast, brightness, hue, etc., by correcting an offset value determined by a user or determined by the image processing apparatus 1 in advance with respect to the brightness signal Y and the chrominance signals Cb and Cr output from the second image processing unit 300.

The output unit 500 converts and outputs the brightness signal Y and the chrominance signals Cb and Cr output from the offset adjusting unit 400 in an international telecommunication union (ITU) format or other appropriate format based on the system demands and/or configuration.

A configuration of the second image processing unit 300 is described in detail below.

The second image processing unit 300 includes a processing unit 310 performing filtering of the chromaticity signal C in a predetermined bandwidth, a sensing unit 320 sensing an amplitude of a noise level, and a control unit 330 selecting one of a plurality of bandwidths to be applied in the filtering to correspond to the amplitude of the noise level.

When the brightness signal Y and the chromaticity signal C are input from the first image processing unit 200, the processing unit 310 converts the chromaticity signal C into the chrominance signals Cb and Cr. The processing unit 310 filters the chromaticity signal in a specific bandwidth to remove a brightness signal Y component which may be mixed to the chromaticity signal C.

The processing unit 310 may use a plurality of bandwidths to be applied in the filtering, where each bandwidth may have a different range. The reason that a plurality of different bandwidths are provided is as follows.

When a composite image signal is converted to the brightness signal Y and the chromaticity signal C in the first image processing unit 200, the first image processing unit 200 selectively performs one of the two-dimensional comb filtering and the three-dimensional comb filtering depending on the amplitude of the noise level of the image signal.

If the noise level of the image signal is relatively large, the two-dimensional comb filtering is performed. If a brightness signal Y component is mixed to the chromaticity signal C, the cross color phenomenon may be caused. Accordingly, the second image processing unit 300 applies the filtering bandwidth of the chromaticity signal C to be relatively narrow (first filtering mode) to remove the brightness signal Y component from the chromaticity signal, thereby preventing the cross color phenomenon.

On the contrary, if the noise level of the image signal is relatively small, the three-dimensional comb filtering is performed. The amount of a brightness signal Y component that is mixed to the chromaticity signal C is relatively low. In this case, if a filtering bandwidth having the same range as for the two-dimensional comb filtering, as described above, is applied, loss of image information due to the bandwidth unnecessarily narrowed in excess may happen. Accordingly, in this case, the second image processing unit 300 applies the filtering bandwidth of the chromaticity signal C to be relatively wide (second filtering mode), thereby minimizing the loss of the image information and improving the quality of an image.

Figure 2:
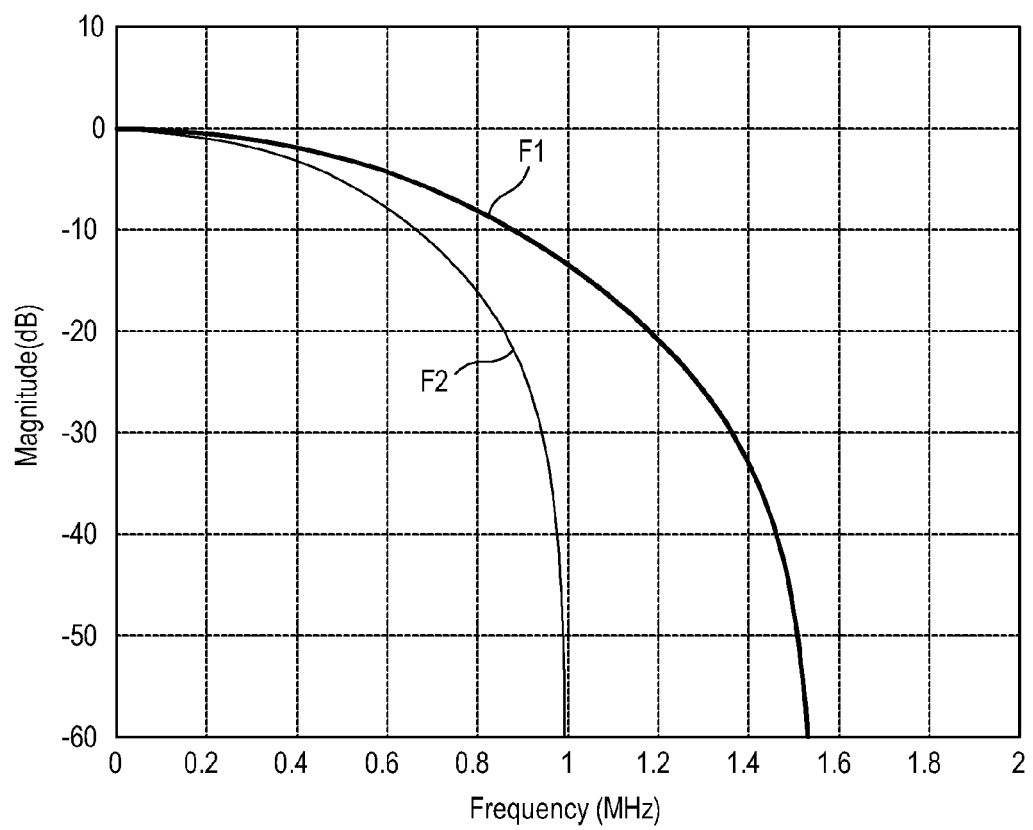
FIG. 2 illustrates an example of a filtering mode performed in the image processing apparatus of FIG. 1.

FIG. 2 is a graph illustrating an example of the filtering bandwidth used by the processing unit 310 of the second image processing unit 300. The horizontal axis represents frequency and the vertical axis represents magnitude.

First and second curves F1 and F2 respectively represent described the second and first filtering modes. Although only two curves corresponding to the two filtering modes are shown in FIG. 2, the present invention is not limited thereto.

Comparing the first curve F1 and the second curve F2 shown in FIG. 2, the frequency upper limit of the first curve F1 is equal to or greater than 1.5 MHz, and that of the second curve F2 is equal to approximately 1.0 MHz. Accordingly, the frequency bandwidth of the first curve F1 is wider than that of the second curve F2.

When the noise level of an image signal is relatively large, the two-dimensional comb filtering is performed in the first image processing unit 200. The processing unit 310 filters the chromaticity signal C through the filtering mode of the second curve F2. Accordingly, a brightness signal Y mixed to the chromaticity signal C is removed, thereby preventing the cross color phenomenon.

When the noise level of an image signal is relatively small, the three-dimensional comb filtering is performed in the first image processing unit 200. The processing unit 310 filters the chromaticity signal C through the filtering mode of the first curve F1. Accordingly, loss of image information due to the filtering can be minimized.

The first image processing unit 200 automatically selects and operates the two-dimensional comb filtering mode or the three-dimensional comb filtering mode. The second image processing unit 300 includes the sensing unit 320 to detect the noise level of an image signal input to the second image processing unit 300.

To sense the noise level of the image signal, the sensing unit 320 detects the amplitude of the image signal during a predetermined period of the image signal in which image information is not included. For example, the sensing unit 320 may sense the noise level in a horizontal synchronization period or a vertical blanking period of the brightness signal Y in which image information is not included.

The sensing unit 320 is not limited to detecting the noise level with respect to a point in time the image signal is input to the second image processing unit 300. The noise level of the image signal may be detected at various points in time depending on a design configuration.

The control unit 330 may be implemented as a microcontroller unit (MCU) including a memory. The control unit 330 determines whether the noise level of an image signal is large or small based on the amplitude of the noise level detected in the sensing unit 320. For example, the control unit 330 may compare the amplitude of the detected noise level with a predetermined value. The control unit 330 may determine that the noise level is relatively large if the amplitude of the noise level is greater than or equal to the predetermined value, and may determine that the noise level is relatively small if the amplitude of the noise level is smaller than the predetermined value. Of course, other techniques may be used.

If the control unit 330 determines that the noise level is relatively large, the control unit 330 may determine that the first image processing unit 200 performs the two-dimensional comb filtering with respect to a corresponding image signal. On the contrary, if the control unit 330 determines that the noise level is relatively small, the control unit 330 may determine that the first image processing unit 200 performs the three-dimensional comb filtering with respect to a corresponding image signal.

Accordingly, the control unit 330 adjusts the filtering bandwidth used in the processing unit 310 to correspond to the noise level. In detail, the control unit 330 selects a relatively narrow bandwidth from a plurality of predetermined bandwidths as the noise level becomes greater, and selects a relatively wide bandwidth from the plurality of predetermined bandwidths as the noise level becomes smaller. The plurality of predetermined bandwidths may be determined in advance and stored in a memory.

If the filtering mode corresponding to the predetermined bandwidth is determined in advance, as shown in FIG. 2, the control unit 330 selects a filtering mode corresponding to the second curve F2 if the noise level is relatively great, and selects a filtering mode corresponding to the first curve F1 if the noise level is relatively small. The processing unit 310 applies the bandwidth selected by the control unit 330, and filters the chromaticity signal C according to the selected bandwidth.

Although two frequency bandwidths corresponding to two filtering modes are illustrated in FIG. 2, the present invention is not limited thereto. For example, the processing unit 310 may operate in a number of filtering modes corresponding to a number of frequency bandwidths equal to or greater than three bandwidths. The control unit 330 may divide the noise level to a plurality of steps, and may select a filtering mode corresponding to each step.

As described above, a filtering bandwidth used in the second image processing unit 300 is adjusted to correspond to the amplitude of the noise level of an image signal to prevent the cross color phenomenon and minimize loss of an image information, thereby providing an optimal image quality.

Figure 3:
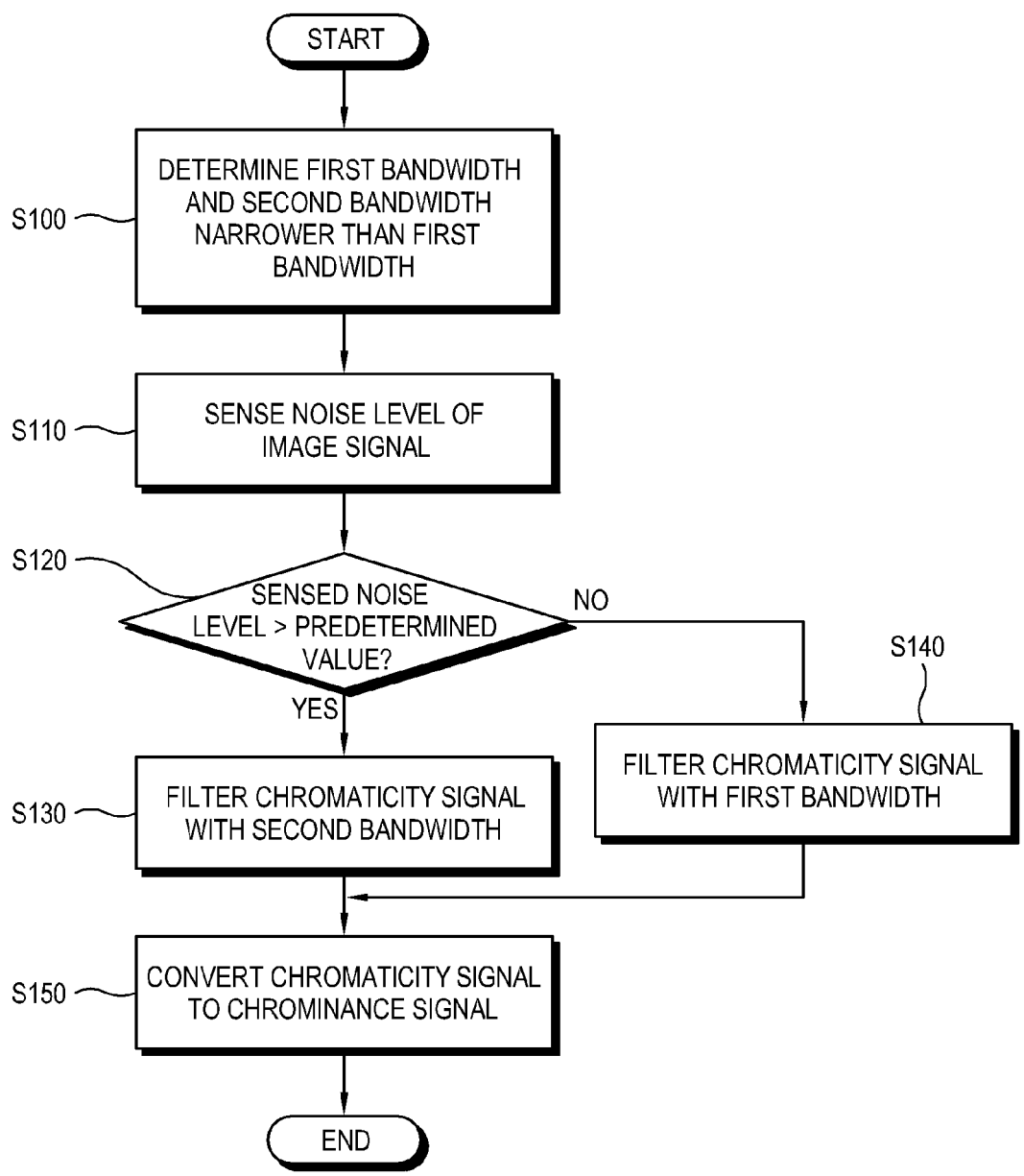
FIG. 3 is a flowchart of a control method for the image processing apparatus of FIG. 1 according to an exemplary embodiment of the present invention.

An operating process of the second image processing unit 300 of the image processing apparatus 1 according to an exemplary embodiment is described below by referring to FIG. 3.

The control unit 330 determines and stores a first bandwidth and a second bandwidth narrower than the first bandwidth (S100). The ranges of the first bandwidth and the second bandwidth are not limited, and may have various values in a manufacturing operation. The operation S100 may be performed in a manufacturing operation of the image processing apparatus 1.

When an analog composite image signal is input to the image processing apparatus 1, the image signal is converted to a digital signal in the ADC unit 100, and is further converted to a brightness signal Y and a chromaticity signal C in the first image processing unit 200 to be input to the second image processing unit 300. The sensing unit 320 senses a noise level of the input image signal (S110). The control unit 330 determines whether the sensed noise level is greater than a predetermined value (S120).

If the noise level is greater than the predetermined value, the control unit 330 controls the processing unit 310 to filter the chromaticity signal C with the second bandwidth which is relatively narrow compared to the first bandwidth (S130). Accordingly, the brightness signal Y is removed from the chromaticity signal C, thereby preventing the cross color phenomenon.

On the contrary, if the noise level is smaller than the predetermined value, since the cross color phenomenon is not apt to occur, the control unit 330 controls the processing unit 310 to filter the chromaticity signal C with the first bandwidth which is relatively wide compared to the second bandwidth (S140). Accordingly, loss of image information due to restriction of a bandwidth is minimized, thereby improving the quality of an image.

The processing unit 310 converts the chromaticity signal C into the chrominance signals Cb and Cr as described above, and outputs the chrominance signals Cb and Cr (S150).

The present invention is not defined to the present exemplary embodiment, and may employ various different embodiments.

The first image processing unit 200 operates in a two-dimensional comb filtering mode or a three-dimensional comb filtering mode depending on one of a motion amount of an input image signal or the amplitude of a noise level. The second image processing unit 300 adjusts a filtering bandwidth to correspond to the noise level. The bandwidth is adjusted to become narrower as the noise level becomes greater.

Here, while the first image processing unit 200 performs a change from the two-dimensional comb filtering to the three-dimensional comb filtering, the second image processing unit 300 increases the bandwidth if the noise level is less than a predetermined first value. A separate general purpose input/output (GPIO) line or a control channel may be provided between the first image processing unit 200 and the second image processing unit 300, and a comb filtering mode converting information of the first image processing unit 200 may be transmitted to the second image processing unit 300.

On the contrary, while the first image processing unit 200 performs a change from the three-dimensional comb filtering to the two-dimensional comb filtering, the second image processing unit 300 decreases the bandwidth if the noise level is equal to or greater than a predetermined second value. The first value and the second value may be variously changed, and may be determined to be different or the same.

As described above, the second image processing unit 300 may adjust the filtering bandwidth to correspond to the sensed noise level depending on the change of the comb filtering mode of the first image processing unit 200.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image processing apparatus comprising:
    a first image processing unit which converts an input image signal into a brightness signal and a chromaticity signal; and
    a second image processing unit which detects a noise level of the input image signal by detecting an amplitude of the image signal during a predetermined period of the image signal in which image information is not included, adjusts a bandwidth used to filter the chromaticity signal based on the detected noise level of the image signal, and filters the chromaticity signal with the adjusted bandwidth to extract a chrominance signal.

2. The image processing apparatus according to claim 1, wherein the second image processing unit adjusts the bandwidth to become narrower as the noise level becomes greater.

3. The image processing apparatus according to claim 1, wherein the second image processing unit comprises:
    a sensing unit which senses an amplitude of the noise level;
    a control unit which selects one of a plurality of bandwidths determined in advance and having different ranges based on the sensed amplitude of the noise level; and
    a processing unit which filters the chromaticity signal with the selected bandwidth.

4. The image processing apparatus according to claim 3, wherein the sensing unit senses the amplitude of the noise level in a period of the image signal in which image information is not included.

5. The image processing apparatus according to claim 3, wherein the sensing unit senses the amplitude of the noise level in one of a horizontal synchronization period and a vertical blanking period of the image signal.

6. The image processing apparatus according to claim 1, wherein the second image processing unit filters the chromaticity signal by restricting a frequency of the chromaticity signal with the adjusted bandwidth, to remove the brightness signal which is mixed to a predetermined frequency band of the chromaticity signal.

7. The image processing apparatus according to claim 1, wherein the first image processing unit performs one of a two-dimensional comb filtering and a three-dimensional comb filtering depending on at least one of a motion amount of the input image signal and an amplitude of the noise level.

8. The image processing apparatus according to claim 7, wherein the second image processing unit filters the chromaticity image with a bandwidth corresponding to the amplitude of the noise level, which bandwidth is adjusted to be narrower as the amplitude of the noise level becomes greater.

9. The image processing apparatus according to claim 7, wherein the second image processing unit performs chroma filtering.

10. An image processing apparatus comprising:
a first image processing unit which converts an input image signal into a brightness signal and a chromaticity signal; and
a second image processing unit which adjusts a bandwidth used to filter the chromaticity signal to correspond to a noise level of the image signal, and filters the chromaticity signal with the adjusted bandwidth to extract a chrominance signal,
wherein the first image processing unit performs one of a two-dimensional comb filtering and a three-dimensional comb filtering depending on at least one of a motion amount of the input image signal and an amplitude of the noise level,
wherein the second image processing unit performs chroma filtering, and
wherein the second image processing unit increases the bandwidth if the amplitude of the noise level is less than a first setting value in a changing operation from the two-dimensional comb filtering to the three-dimensional comb filtering.

11. The image processing apparatus according to claim 10, wherein the second image processing unit decreases the bandwidth if the amplitude of the noise level is equal to or greater than a second setting value in a changing operation from the three-dimensional comb filtering to the two-dimensional comb filtering.

12. A control method for an image processing apparatus, the control method comprising:
converting an input image signal into a brightness signal and a chromaticity signal;
detecting a noise level of the input image signal by detecting an amplitude of the image signal during a predetermined period of the image signal in which image information is not included;
adjusting a filtering bandwidth based on the detected noise level of the image signal;
filtering the chromaticity signal with the adjusted bandwidth; and
converting the chromaticity signal to a chrominance signal.

13. The control method for the image processing apparatus according to claim 12, wherein the adjusting comprises:
adjusting the bandwidth to become narrower as the noise level becomes greater.

14. The control method for the image processing apparatus according to claim 12, further comprising:
sensing an amplitude of the noise level;
selecting one of a plurality of previously determined bandwidths depending on the sensed size of the noise level; and
filtering the chromaticity signal with the selected bandwidth.

15. The control method for the image processing apparatus according to claim 14, wherein the sensing comprises:
sensing the amplitude of the noise level in a period of the image signal in which image information is not included.

16. The control method for the image processing apparatus according to claim 14, wherein the sensing comprises:
sensing the amplitude of the noise level in one of a horizontal synchronization period and a vertical blanking period of the digital image signal.

17. The control method for the image processing apparatus according to claim 12, wherein the filtering the chromaticity signal comprises:
restricting frequency of the chromaticity signal with the adjusted bandwidth; and
removing the brightness signal mixed to a predetermined frequency band of the chromaticity signal.

18. The control method for the image processing apparatus according to claim 12, wherein the converting the input image signal comprises:
operating in one of a two-dimensional comb filtering and a three-dimensional comb filtering based on at least one of a motion amount of the input image signal and the amplitude of the noise level.

19. The control method for the image processing apparatus according to claim 18, wherein the filtering the chromaticity signal comprises:
filtering with the bandwidth corresponding to the amplitude of the noise level, wherein the bandwidth becomes narrower as the amplitude of the noise level becomes greater.

20. The control method for the image processing apparatus according to claim 18, wherein the filtering the chromaticity signal comprises chroma filtering.

21. A control method for an image processing apparatus, the control method comprising:
converting an input image signal into a brightness signal and a chromaticity signal;
adjusting a filtering bandwidth to correspond to a noise level of the image signal;
filtering the chromaticity signal with the adjusted bandwidth; and
converting the chromaticity signal to a chrominance signal,
wherein the converting the input image signal comprises:
operating in one of a two-dimensional comb filtering and a three-dimensional comb filtering based on at least one of a motion amount of the input image signal and an amplitude of the noise level,
wherein the filtering the chromaticity signal comprises chroma filtering, and
wherein the adjusting comprises:
increasing the bandwidth if the amplitude of the noise level is less than a first setting value in a changing operation from the two-dimensional comb filtering to the three-dimensional comb filtering.

22. The control method for the image processing apparatus according to claim 21, wherein the adjusting comprises:
decreasing the bandwidth if the amplitude of the noise level is equal to or greater than a second setting value in a changing operation from the three-dimensional comb filtering to the two-dimensional comb filtering.

* * * * *